United States Patent
Yoo et al.

(10) Patent No.: US 11,251,441 B2
(45) Date of Patent: Feb. 15, 2022

(54) ELASTOMERIC CELL FRAME FOR FUEL CELL, METHOD FOR MANUFACTURING THE SAME AND FUEL CELL USING THE SAME

(71) Applicants: Hyundai Motor Company, Seoul (KR); Kia Motors Corporation, Seoul (KR)

(72) Inventors: Jin Hyeok Yoo, Chungcheongnam-do (KR); Byeong-Heon Jeong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 149 days.

(21) Appl. No.: 16/688,086

(22) Filed: Nov. 19, 2019

(65) Prior Publication Data
US 2020/0365915 A1  Nov. 19, 2020

(30) Foreign Application Priority Data
May 16, 2019 (KR) .......................... 10-2019-0057585

(51) Int. Cl.
  *H01M 8/0273* (2016.01)
  *H01M 8/0258* (2016.01)
  *H01M 8/1004* (2016.01)
  *H01M 8/04089* (2016.01)
  (Continued)

(52) U.S. Cl.
  CPC ....... *H01M 8/0273* (2013.01); *H01M 8/0258* (2013.01); *H01M 8/0267* (2013.01); *H01M 8/04089* (2013.01); *H01M 8/1004* (2013.01); *H01M 8/2483* (2016.02)

(58) Field of Classification Search
  CPC ............. H01M 8/0273; H01M 8/0258; H01M 8/1004; H01M 8/04089; H01M 8/2483; H01M 8/0267; H01M 8/242; H01M 8/2465
  See application file for complete search history.

(56) References Cited

U.S. PATENT DOCUMENTS

| 2003/0013000 A1* | 1/2003 | Kuroki | H01M 8/0271 429/431 |
| 2011/0136038 A1* | 6/2011 | Ishida | H01M 8/0276 429/480 |

(Continued)

FOREIGN PATENT DOCUMENTS

| JP | 5543610 B2 | 7/2014 |
| JP | 2017-212126 A | 11/2017 |
| KR | 10-2018-0011716 A | 2/2018 |

*Primary Examiner* — Stewart A Fraser
(74) *Attorney, Agent, or Firm* — Mintz Levin Cohn Ferris Glovsky and Popeo, P.C.; Peter F. Corless

(57) ABSTRACT

An elastomeric cell frame for a fuel cell includes an insert in which a membrane electrode assembly and a pair of gas diffusion layers disposed on both surfaces of the insert have been bonded; a separator assembly disposed on one of the surfaces of the insert while a pair of separators is configured to face each other; and a sheet-shaped elastomeric frame disposed to surround a rim of the insert and a rim of the separator assembly and a side surface thereof in outside regions of the insert and the separator assembly, and integrally bonded with the rim of the insert and the rim of the separator assembly by thermal bonding.

20 Claims, 8 Drawing Sheets

(51) Int. Cl.
   *H01M 8/2483*      (2016.01)
   *H01M 8/0267*      (2016.01)

(56) References Cited

U.S. PATENT DOCUMENTS

2013/0157175 A1*  6/2013  Ma .......................... H01M 8/10
                                                    429/535
2016/0111746 A1   4/2016  Uehara
2016/0141636 A1   5/2016  Kadono et al.

* cited by examiner

ELASTOMERIC CELL FRAME FOR FUEL CELL, METHOD FOR MANUFACTURING THE SAME AND FUEL CELL USING THE SAME

CROSS REFERENCE TO RELATED APPLICATION

The present application claims under 35 U.S.C. § 119(a) the benefit of Korean Patent Application No. 10-2019-0057585 filed on May 16, 2019, the entire contents of which are incorporated by reference herein.

BACKGROUND

(a) Technical Field

The present disclosure relates to an elastomeric cell frame for a fuel cell, a method for manufacturing the same, and a fuel cell stack using the same, more particularly, to the elastomeric cell frame the integrally bonds a membrane electrode assembly, a gas diffusion layer, and a separator without a separate adhesive member by using a sheet-shaped elastomeric frame made of a thermoplastic elastomer (IPE).

(b) Description of the Related Art

A fuel cell is a type of power generation device for electrochemically reacting chemical energy of fuel in a stack to convert it into electrical energy, can be used to supply not only the driving power of industrial, household, and vehicles but also to supply power of small electronic products such as portable devices, and recently, its scope of use is gradually expanding as to clean energy source of high efficiency.

A unit cell of a fuel cell has a Membrane Electrode Assembly (MEA) disposed at an innermost part thereof, and the membrane electrode assembly is composed of a polymer electrolyte membrane capable of transferring a hydrogen proton, and a catalyst layer, that is, a cathode and an anode applied on both surfaces of the polymer electrolyte membrane so that hydrogen and oxygen can react with each other.

In addition, a pair of separators for supplying a reactant gas and discharging water generated by the reaction is disposed on one surface and the other surface of the membrane electrode assembly, that is, on the outer portion where the cathode and the anode are disposed. At this time, a Gas Diffusion Layer (GDL) for diffusing or smoothing the flow of the reactant gas and the generated water can be interposed between the membrane electrode assembly and the separator.

Meanwhile, a Membrane-Electrode-Gasket Assembly (MEGA) for integrating the membrane electrode assembly and a gasket has been conventionally manufactured and used for maintaining airtightness of the unit cell and convenience in a stacking process as well.

In addition, an integrated frame for integrating an insert having the gas diffusion layer bonded to the membrane electrode assembly and the gasket has also been proposed.

However, the conventional integrated frame typically has bonded a frame and an insert of a plastic material by using an adhesive agent. In addition, when manufacturing the unit cell by using the conventional integrated frame, an adhesive member and a sealing member have been separately required for adhering the separator and the integrated frame. This process may result in an increase in the material cost and the manufacturing cost.

In addition, conventionally, a pair of separators facing each other has been bonded in advance and then used in a stacking process in order to align the separators facing each other in the unit cells adjacent to each other when stacking the unit cell.

At this time, a manifold part where the reactant gas and the coolant flow into and flow out is formed on the pair of separators stacked. There has been a problem that since the manifold part of the separator made of a metal material is a structure that directly contacts the reactant gas and the generated water, the manifold part of the metal material becomes corroded when the fuel cell is driven for a long time.

In addition, there has been a problem in that since the metal separator composed of the thin plate is used in order to reduce the volume of the fuel cell, the outer manifold part of the separator of the thin plate is liable to be deformed due to an external impact and is very difficult to handle.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides an elastomeric cell frame for a fuel cell, a method for manufacturing the same, and a fuel cell stack using the same, which integrally bonds a membrane electrode assembly, a gas diffusion layer, and a separator without a separate adhesive member by using a sheet-shaped elastomeric frame made of a thermoplastic elastomer (TPE).

In addition, the present disclosure the elastomeric cell frame for the fuel cell, the method for manufacturing the same, and the fuel cell stack using the same, which can have a plurality of inflow manifold through-hole and a plurality of outflow manifold through-hole on the elastomeric frame, and the separator does not form a manifold region, thereby solving the corrosion and bending deformation problems caused in the manifold region.

An elastomeric cell frame constituting a unit cell of a fuel cell includes: an insert in which a membrane electrode assembly and a pair of gas diffusion layers disposed on both surfaces thereof have been bonded; a separator assembly disposed on one surface of the insert while a pair of separators is configured to face each other; and a sheet-shaped elastomeric frame disposed to surround a rim of the insert and the rim of the separator assembly and the side surface thereof in the outside regions of the insert and the separator assembly, and integrally bonded with the rim of the insert and the rim of the separator assembly by thermal bonding.

The thermal bonding may be one of hot-press bonding, ultrasonic bonding, high frequency bonding, vibration bonding, infrared bonding, radiant-heat bonding, calender bonding and laser bonding.

The elastomeric frame is formed with a reaction surface through-hole in which the insert is disposed, the inner circumferential surface of the reaction surface through-hole is formed with a first step for surrounding any one surface of both surfaces of the insert and the side surface thereof, and the outside of the first step is formed with a second step for surrounding any one surface of both surfaces of the separator assembly and the side surface thereof.

Any one of the pair of gas diffusion layers constituting the insert corresponds to the size of the inner circumferential surface of the first step, and the other one of the pair of gas diffusion layers and the membrane electrode assembly correspond to the size of the inner circumferential surface of the second step.

A first fusion part thermally bonded while facing the first step of the elastomeric frame and the membrane electrode assembly of the insert is formed between the insert and the elastomeric frame, and a second fusion part thermally bonded while facing the second step of the elastomeric frame and any one surface of both surfaces of the separator assembly is formed between the separator assembly and the elastomeric frame.

A third fusion part thermally bonded while facing the first step of the elastomeric frame and the membrane electrode assembly of the insert and the side surfaces of the pair of gas diffusion layers is formed between the insert and the elastomeric frame, and a fourth fusion part thermally bonded while facing the second step of the elastomeric frame and the side surface of the separator assembly is formed between the separator assembly and the elastomeric frame.

A plurality of inflow manifold through-holes into which reactant gas and coolant flow are formed at one side of the elastomeric frame, and a plurality of outflow manifold through-holes out which the reactant gas and the coolant flow are formed at the other side thereof, and the first step and the second step are formed between the plurality of inflow manifold through-holes and the plurality of outflow manifold through-holes.

At least one sealing protrusion for surrounding the separator assembly is formed on one surface of both surfaces of the elastomeric frame along the outside of the region where the separator assembly is disposed.

At least one sealing groove for surrounding the separator assembly along the outside of the region where the separator assembly is disposed, and having a shape corresponding to the sealing protrusion at a position corresponding to the position where the sealing protrusion has been formed is formed on the other surface of both surfaces of the elastomeric frame.

The separator assembly is composed of a first separator and a second separator facing each other, the first separator is formed with a plurality of first assembly through-holes to be spaced apart from each other at a predetermined region along the rim thereof, the second separator is formed with a plurality of second assembly through-holes communicated to the first assembly through-hole, and the second step of the elastomeric frame is formed with an assembly protrusion for penetrating the first assembly through-hole and the second assembly through-hole.

The end portion of the assembly protrusion is thermally bonded and the diameter thereof becomes larger than the other regions of the assembly protrusion to be bonded to the surface of the separator assembly.

The separator assembly is composed of a first separator and a second separator facing each other, a first uneven protrusion laterally extended from the side surface thereof is formed on the first separator, a second uneven protrusion laterally extended from the side surface thereof, and having the shape corresponding to the first uneven protrusion, and an uneven groove part formed horizontally with the surface of the elastomeric frame, and coupled with the first uneven protrusion and the second uneven protrusion is formed on the outer circumferential surface of the second step.

A cover part extended to cover the rim of the separator assembly is formed on one surface of both surfaces of the elastomeric frame, and a cover groove having the shape corresponding to the cover part at a position corresponding to the position where the cover part has been formed is formed on the other surface of both surfaces of the elastomeric frame.

The elastomeric frame is formed of a thermoplastic elastomer (TPE).

Meanwhile, a method for manufacturing an elastomeric cell frame constituting a unit cell of a fuel cell stack according to an embodiment of the present disclosure includes: preparing an insert by bonding a gas diffusion layer on both surfaces of a membrane electrode assembly, respectively; preparing a separator assembly while facing and bonding a pair of separators; preparing an elastomeric frame in a sheet shape; disposing an upper portion of the elastomeric frame so as to overlap rims of the insert and the separator assembly; and bonding by thermal bonding the overlapped portion between the elastomeric frame, the insert, and the separator assembly.

The thermal bonding may be one of hot-press bonding, ultrasonic bonding, high frequency bonding, vibration bonding, infrared bonding, radiant-heat bonding, calender bonding and laser bonding.

In preparing the elastomeric frame, the elastomeric frame prepares by molding a thermoplastic elastomer (TPE) in a sheet shape.

In preparing the elastomeric frame, the elastomeric frame is formed with a reaction surface through-hole in which the insert is disposed, the inner circumferential surface of the reaction surface through-hole is formed with a first step for surrounding any one surface of both surfaces of the insert and the side surface thereof, and the outside of the first step is formed with a second step for surrounding any one surface of both surfaces of the separator assembly and the side surface thereof, and in the disposing, the rim of the insert is disposed to be seated on the first step, and the separator assembly is disposed to be seated on the second step.

In the bonding the heat applied to the elastomeric frame is a temperature higher than the melting temperature of the elastomeric frame.

In the bonding, the elastomeric frame is bonded to the insert and the separator assembly while the elastomeric frame is thermally bonded without a separate adhesive member.

Meanwhile, a fuel cell stack according to an embodiment of the present disclosure is formed by stacking a plurality of elastomeric cell frames including an insert in which a membrane electrode assembly, and a pair of gas diffusion layers disposed on both surfaces thereof have been bonded; a separator assembly disposed on one surface of the insert while a pair of separators is configured to face each other; and a sheet-shaped elastomeric frame disposed to surround a rim of the insert and a rim of the separator assembly and a side surface thereof in the outside regions of the insert and the separator assembly, and integrally bonded with at least the rim of the insert and the rim of the separator assembly while being thermally bonded, and is stacked while the elastomeric frames of the elastomeric cell frame adjacent to each other are bonded by thermal bonding therebetween.

The elastomeric frames of the elastomeric cell frame adjacent to each other are formed with a fifth fusion part bonded by thermal bonding therebetween in the region facing each other.

The elastomeric frames of the elastomeric cell frame adjacent to each other are formed with a sixth fusion part bonded while the respective side surfaces thereof are integrally thermally bonded.

According to an embodiment of the present disclosure, the following effects can be obtained.

Firstly, no separate adhesive member is required for the interface bonding between the separator and the insert, thereby saving the material cost and the manufacturing cost by eliminating the adhesive agent application process.

Secondly, it is possible to secure airtightness of the reaction region without a separate sealing member, and it is possible to save the material cost as the sealing member becomes unnecessary, and the manufacturing cost by eliminating the sealing member molding process.

Thirdly, it is possible to reduce the amount of the metal material used that forms the separator because the manifold region is not formed on the separator, thereby saving the manufacturing cost.

Fourthly, it is possible to originally suppress the corrosion caused by the generated water in the manifold region because the manifold region is not formed on the separator, thereby enhancing the durability of the fuel cell stack.

Fifthly, it is possible to suppress the bending deformation due to the external impact in the manifold region because the manifold region is not formed on the separator, thereby enhancing the handling performance of the separator.

Sixthly, it is possible to constitute the stack by stacking the elastomeric cell frame that integrates the insert, the separator, and the elastomeric frame, thereby easing the inter-cell stacking and enhancing the stability of the stack structure.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
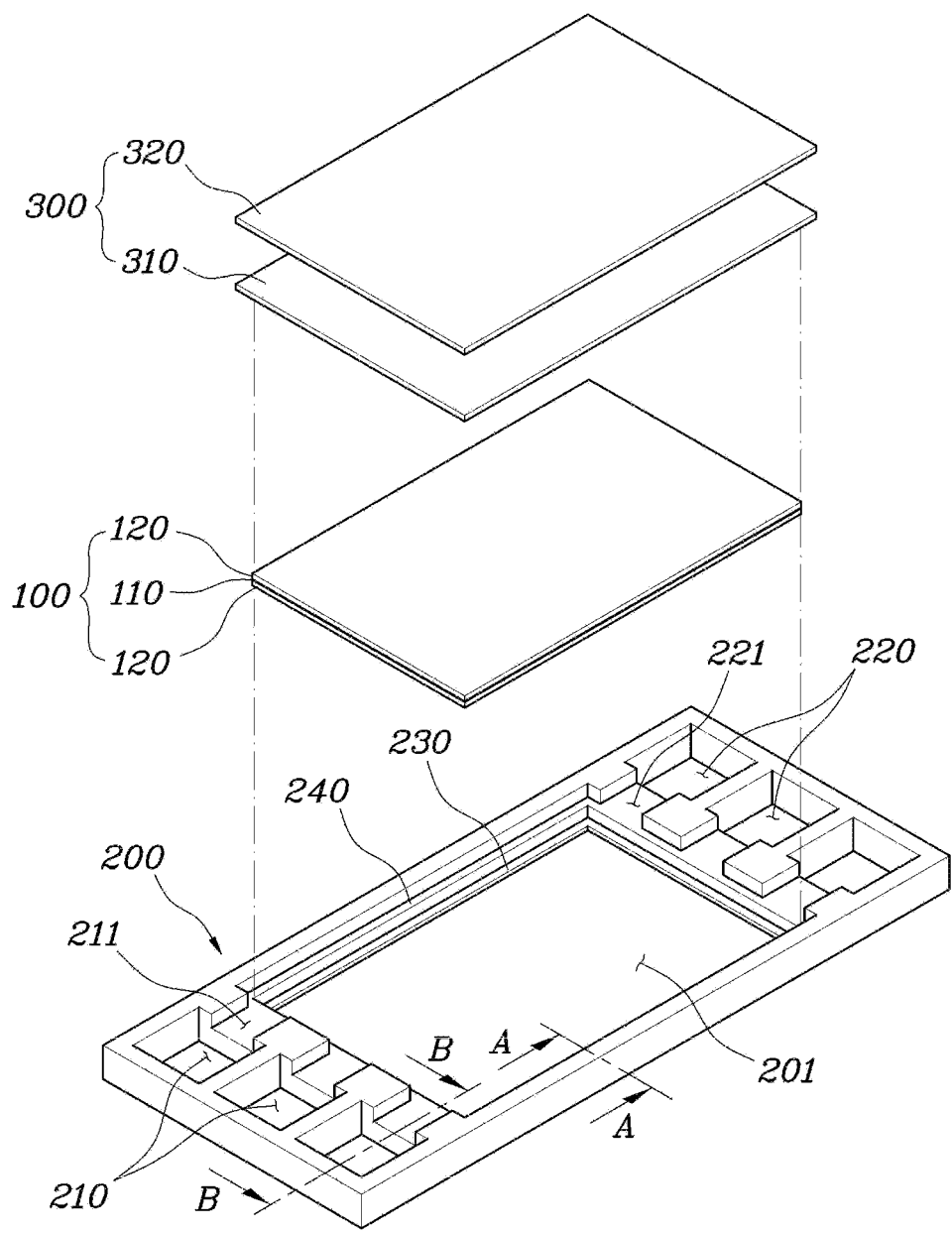
FIG. 1 is an exploded perspective diagram showing an elastomeric cell frame for a fuel cell according to a first embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in more detail with reference to the accompanying drawings. However, the present disclosure is not limited to the embodiments disclosed below but can be implemented in various forms differently from each other and rather, these embodiments are provided so that the present disclosure will be thorough and complete and to completely convey the scope of the disclosure to those skilled in the art. The same reference numerals refer to the same elements in the drawings.

Figure 2A:
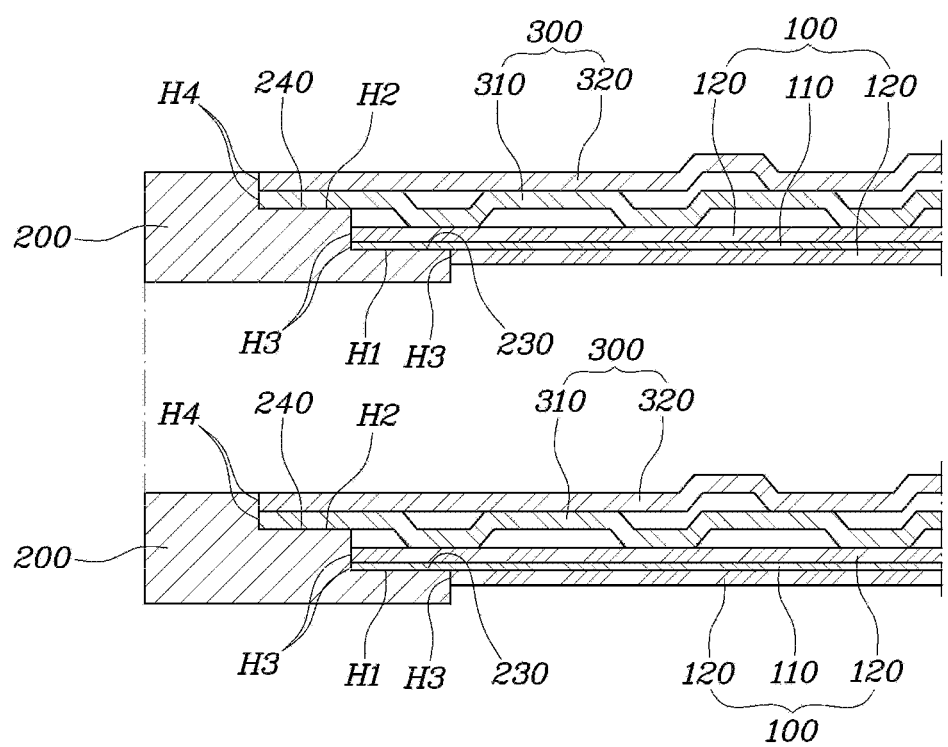
FIGS. 2A and 2B are diagrams showing a cross section taken along the line A-A in FIG. 1.
Figure 2B:
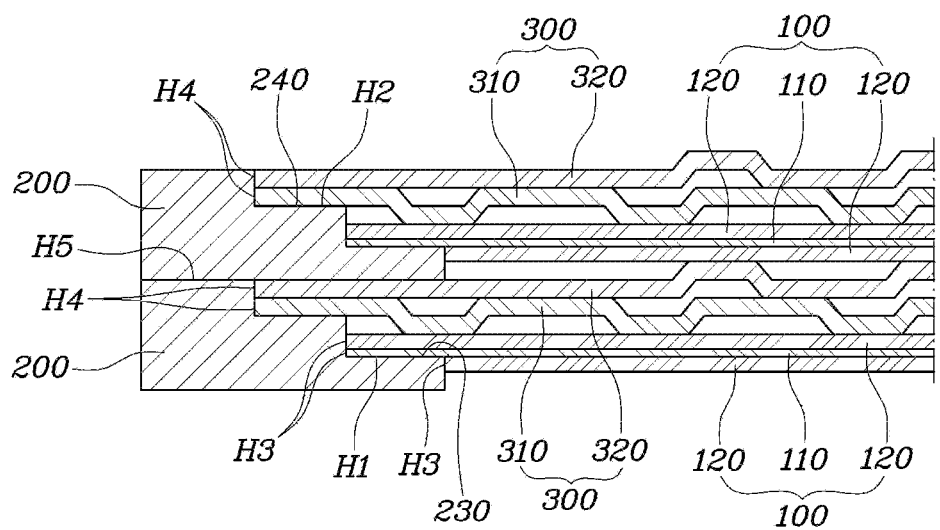

FIG. 1 is an exploded perspective diagram showing an elastomeric cell frame for a fuel cell according to a first embodiment of the present disclosure, and FIGS. 2A and 2B are diagrams showing a cross section taken along the line A-A in FIG. 1.

As shown in FIG. 1, e.g., an elastomeric cell frame for a fuel cell according to a first embodiment of the present disclosure includes an insert 100 to which a membrane electrode assembly 110 and a pair of gas diffusion layers 120 disposed on both surfaces of the insert 100 has been bonded; a separator assembly 300 disposed on one of the surfaces of the insert 100 with a pair of separators 310, 320 facing each other; and an elastomeric frame 200 integrally formed in an outside region of the insert 100 and the separator assembly 300 by thermal bonding.

Here, the thermal bonding may be one of hot-press bonding ultrasonic bonding, high frequency bonding, vibration bonding, infrared bonding, radiant-heat bonding, calender bonding and laser bonding. In particular, the thermal bonding is preferably a hot-press bonding in which heat and pressure are easily provided.

The insert 100 is a bonding body obtained by stacking the membrane electrode assembly 110 and the pair of gas diffusion layers 120, and preferably, the gas diffusion layer 120 is disposed and stacked on one surface and the other surface of the membrane electrode assembly 110, respectively.

The membrane electrode assembly 110 is implemented by a polymer electrolyte membrane capable of transferring a hydrogen proton, and a general membrane electrode assembly composed of a catalyst layer, that is, a cathode and an anode applied on both surfaces of the polymer electrolyte membrane so that hydrogen and oxygen can react with each other.

The gas diffusion layer 120, configured to pass through by diffusing the reactant gas flowing through the separator (not shown) into the membrane electrode assembly 110, is made of a base material alone or the base material and a micro-porous layer (MPL) formed on one surface of the base material. At this time, the base material and the material of the micro-porous layer are implemented by a material applied to a general gas diffusion layer.

The separator assembly 300 is composed of the first separator 310 and the second separator 320 facing each other. At this time, the passage through which the reactant gas and the generated water flow is formed in various forms in the first separator 310 and the second separator 320. For example, the passage can be formed by forming a land and a channel by bending a region corresponding to a region where the membrane electrode assembly 110 is disposed. In addition, a diffusing part, which is diffused while the reactant gas and the generated water flow into the passage, and collected while being discharged from the passage.

Meanwhile, the first separator 310 and the second separator 320 constituting the separator assembly 300 are not a pair of separators constituting the unit cells but refer to a pair of separators adjacent to each other in the adjacent unit cells. For example, a cathode separator disposed at the cathode side of the membrane electrode assembly 110 constituting any one of unit cells can be defined as the first separator 310, and an anode separator disposed at the anode side of the membrane electrode assembly 110 constituting another unit cell adjacent to the corresponding unit cell can be defined as the second separator 320.

At this time, the first separator 310 and the second separator 320 facing each other in the unit cells adjacent to each other are welded at a predetermined position in a state facing each other to form the separator assembly 300.

The elastomeric frame 200 is integrally formed on the outside region of the insert 100 for maintaining airtightness of the insert 100 and for convenience in the stacking process, and the elastomeric frame 200 is formed of a thermoplastic elastomer (TPE) for bonding by thermal bonding without a separate adhesive member while maintaining a predetermined shape.

That is, the elastomeric frame 200 is disposed to surround a rim of the insert 100 and a side surface thereof and a rim of the separator assembly 300 and a side surface thereof in outer surfaces of the insert 100 and the separator assembly 300, and is integrally formed with the rim of the insert 100 and the rim of the separator assembly 300 and the side surface thereof.

Herein, the term "outside region" of the insert 100 and the separator assembly 300 refers to a region including edge regions of the insert 100 and the separator assembly 300 and space adjacent thereto, and the "rim" of the insert 100 and the separator assembly 300 refers to the edge regions of the insert 100 and the separator assembly 300. In addition, for convenience of explanation, the elastomeric frame 200 is disposed to surround any one surface of both surfaces of the rim of the insert 100 and the side surface thereof and any one surface of both surfaces of the rim of the separator assembly 300 and the side surface thereof, such that the rim of the insert 100 and the separator assembly 300 will be referred to as a "lower surface" in the following description. The rim of the insert 100 and the separator assembly 300 is not limited to the "lower surface" described below and can be the opposite surface thereof, that is, the "upper surface." In addition, any one surface of both surfaces of the rim of the separator assembly 300 refers to any one surface of the pair of separators constituting the separator assembly 300. Therefore, as shown in FIG. 2, in the separator assembly 300 composed of the first separator 310 and the second separator 320, any one surface of both surfaces of the rim of the separator assembly 300 will be described by being referred to as a "lower surface" of the first separator.

For example, as shown in FIGS. 2A and 2B, the elastomeric frame 200 is disposed to surround the outside regions of the insert 100 and the separator assembly 300 while facing the lower surface and side surface of the rim of the insert 100 and the lower surface and side surface of the rim of the separator assembly 300.

In particular, the elastomeric frame 200 can extend the interface between the insert 100 and the separator assembly 300 for airtight adhesion with the insert 100 and the separator assembly 300.

For example, the elastomeric frame 200 is formed with a reaction surface through-hole 201 in which the insert 100 is disposed, and the inner circumferential surface of the reaction surface through-hole 201 is formed with a first step 230 for surrounding the lower surface and the side surface of the insert 100.

Then, a second step 240 for surrounding the lower surface and the side surface of the separator assembly 300 is formed on the inner circumferential surface of the first step 230 formed on the elastomeric frame 200.

Therefore, a fusion portion is formed at the interface between the insert 100 and the separator assembly 300 and the elastomeric frame 200 by the thermal bonding, respectively, thereby implementing the firm bonding and the integration therebetween.

That is, as shown in FIGS. 2A and 2B, a first fusion part H1 thermally bonded while facing the first step 230 of the elastomeric frame 200 and the lower surface of the insert 100 is formed between the insert 100 and the elastomeric frame 200, and a second fusion part H2 thermally bonded while facing the second step 240 of the elastomeric frame 200 and the lower surface of the separator assembly 300 is formed between the separator assembly 300 and the elastomeric frame 200.

Then, a third fusion part H3 thermally bonded while facing the first step 230 of the elastomeric frame 200 and the side surface of the insert 100 is formed between the insert 100 and the elastomeric frame 200, and a fourth fusion part H4 thermally bonded while facing the second step 240 of the elastomeric frame 200 and the side surface of the separator assembly 300 is formed between the separator assembly 300 and the elastomeric frame 200.

However, since the membrane electrode assembly 110 and the gas diffusion layer 120 forming the insert 100 are formed of different materials, there is a difference in bonding performance with the elastomeric frame 200. In the present embodiment, since the thermoplastic elastomer (TPE) forming the elastomeric frame 200 has better bonding properties with the membrane electrode assembly 110 than the gas diffusion layer 120, any one of the pair of gas diffusion layers 120 constituting the insert 100 corresponds to the size of the inner circumferential surface thereof, and the other one of the pair of gas diffusion layers 120 constituting the insert 100 and the membrane electrode assembly 110 is formed at the size corresponding to the size of the inner circumferential surface of the second step 240. Therefore, it is preferable that when the insert 100 is bonded to the first step 230, the first fusion part H1 thermally bonded while facing the first step 230 of the elastomeric frame 200 and the lower surface of the membrane electrode assembly 110 of the insert 100 is formed, and the third fusion part H3 thermally bonded while facing the first step 230 of the elastomeric frame 200 and the membrane electrode assembly 110 of the insert 100 and the side surfaces of the pair of gas diffusion layers 120 is formed.

Meanwhile, the elastomeric frame 200 is formed with an inflow manifold through-hole 210 and an outflow manifold through-hole 220 for forming a manifold for flowing the reactant gas and the coolant into and from the reaction surface formed by the insert 100.

For example, a plurality of inflow manifold through-holes 210 into which the reactant gas and the coolant flow are formed at one side of the elastomeric frame 200, and a plurality of outflow manifold through-holes 220 out which the reactant gas and the coolant flow are formed on the other side thereof.

Therefore, the first step 230 and the second step 240 are formed between the plurality of inflow manifold through-holes 210 and the plurality of outflow manifold through-holes 220.

Figure 3:
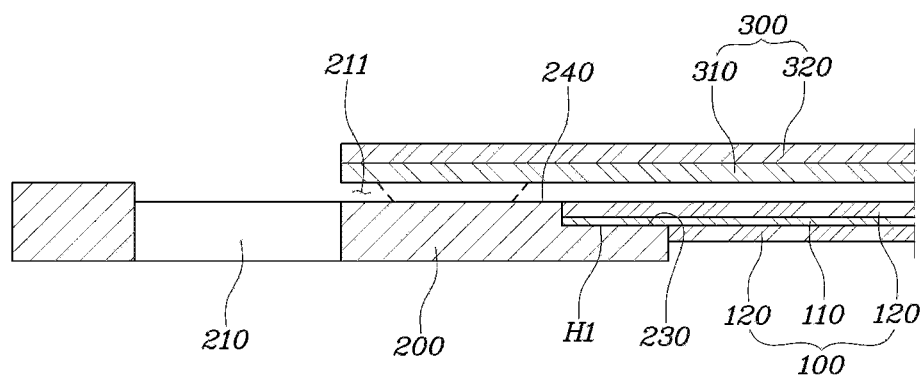
FIG. 3 is a diagram showing a cross section taken along the line B-B in FIG. 1.

Then, as shown in FIGS. 1 and 3, an inflow connection passage 211 for communicating the respective inflow manifold through-holes 210 with the reaction surface through-holes 201 is formed on the upper surface of the elastomeric frame 200, and an outflow connection passage 221 for communicating the respective outflow manifold through-holes 220 with the reaction surface through-holes 201 are formed. At this time, it is preferable that the depths of the inflow connection passage 211 and the outflow connection passage 221 are formed at a level that can communicate with the region where the second step 240 has been formed. For example, in the present embodiment, the depths of the inflow connection passage 211 and the outflow connection passage 221 were formed at the depth corresponding to the height of the upper surface of the second step 240.

Meanwhile, a method for manufacturing the elastomeric cell frame for the fuel cell configured as described above will be described.

The method for manufacturing an elastomeric cell frame for a fuel cell according to an embodiment of the present disclosure includes preparing the insert 100 by bonding the gas diffusion layer 120 to both surfaces of the membrane electrode assembly 110, respectively; preparing the separator assembly 300 while facing and bonding the pair of separators 310, 320; disposing on the upper portion of the elastomeric frame 200 so that the rims of the insert 100 and the separator assembly 300 are overlapped with each other; and bonding that integrally forms by thermal bonding therebetween by pressing while applying heat to the overlapped portion between the elastomeric frame 200, the insert 100, and the separator assembly 300.

The preparing the insert is preparing the insert 100 by bonding the membrane electrode assembly 110 and the gas diffusion layer 120.

At this time, the membrane electrode assembly 110 prepares a polymer electrolyte membrane, and a general membrane electrode assembly in which a cathode and an anode are formed on both surfaces of the polymer electrolyte membrane.

In addition, the gas diffusion layer 120 also prepares a general gas diffusion layer made of the base material alone or the base material and a micro-porous layer (MPL) formed on one surface of the base material.

Then, the insert 100 is prepared by stacking the gas diffusion layer 120 on both surfaces of the membrane electrode assembly 110.

However, as described above, in order to enhance the bonding performance between the insert 100 and the elastomeric frame 200, any one of the pair of gas diffusion layers 120 can be formed to have the size smaller than those of the membrane electrode assembly 110 and the other one of gas diffusion layers 120 so that the exposed region is thermally bonded to the first step 230 of the elastomeric frame 200 while the lower surface of the membrane electrode assembly 110 is exposed in the bonding described later.

The preparing the separator assembly is integrating the first separator 310 and the second separator 320.

Firstly, the separator assembly 300 is prepared by molding the first separator 310 and the second separator 320 made of a metal material, respectively, and then welding the first separator 310 and the second separator 320 at a predetermined position in a state facing each other. At this time, the manifold region is not formed in the first separator 310 and the second separator 320, and only the passage through which the reactant gas and the coolant flow is formed thereon.

The preparing the elastomeric frame is preparing the sheet-shaped elastomeric frame 200 disposed to surround the insert 100 and the outside region of the separator assembly 300.

Meanwhile, at the time of molding the elastomeric frame 200, the reaction surface through-hole 201 in which the insert 100 is disposed; the plurality of inflow manifold through-holes 210 into which the reactant gas and the coolant flow; the plurality of outflow manifold through-holes 220 out which the reactant gas and the coolant flow; the first step 230 for surrounding the lower surface and the side surface of the insert 100 on the inner circumferential surface of the reaction surface through-hole 201; and the second step 240 for surrounding the lower surface and the side surface of the separator assembly 300 in the outside region of the first step 230 are formed.

The disposing is disposed so that the rims of the insert 100 and the separator assembly 300 are overlapped with the elastomeric frame 200. For example, the rim of the insert 100 is disposed to be seated on the first step 230, and the separator assembly 300 is disposed to be seated on the second step 240.

Preferably, the lower surface of the rim of the insert 100 is seated on the first step 230 of the elastomeric frame 200 so that the side surface of the rim of the insert 100 faces the inner circumferential surface of the reaction surface through-hole 201 of the elastomeric frame 200 and the outer circumferential surface of the first step 230. Then, the lower surface of the rim of the separator assembly 300 is seated on the second step 240 of the elastomeric frame 200 so that the side surface of the rim of the separator assembly 300 faces the outer circumferential surface of the second step 240 of the elastomeric frame 200.

The bonding is bonding the elastomeric frame 200, the insert 100, and the separator assembly 300 to each other by the thermal bonding of the elastomeric frame 200.

Here, the thermal bonding may be one of hot-press bonding ultrasonic bonding, high frequency bonding, vibration bonding, infrared bonding, radiant-heat bonding, calender bonding and laser bonding. In particular, the thermal bonding is preferably a hot-press bonding in which heat and pressure are easily provided.

For this purpose, the elastomeric frame 200 and the insert 100 are seated in the hot-press mold.

Then, the insert 100 and the separator assembly 300 are bonded while the elastomeric frame 200 is melted at a predetermined position by applying heat to some or all of the region corresponding to the outside regions of the insert 100 and the separator assembly 300 by operating the hot-press mold. Therefore, the elastomericic frame 200, the insert 100, and the separator assembly 300 are bonded while the elastomeric frame 200 is thermally bonded at the interface thereof even without a separate adhesive member.

At this time, the heat applied to the elastomeric frame 200 is preferably higher than the melting temperature of the elastomeric frame 200 in order to firmly bond the elastomeric frame 200 and the insert 100 and the separator assembly 300.

Meanwhile, the shapes of the elastomeric frame 200 and the separator assembly 300 can be changed in order to enhance the bonding performance between the elastomeric frame 200 and the separator assembly 300 and the bonding performance between the stacked elastomeric frames 200.

Figure 4A:
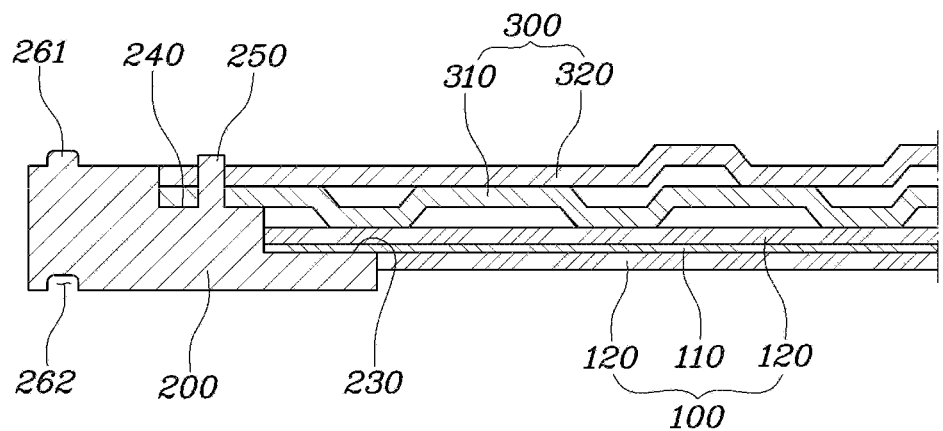
FIGS. 4A and 4B are diagrams showing an elastomeric cell frame for a fuel cell according to a second embodiment of the present disclosure.
Figure 4B:
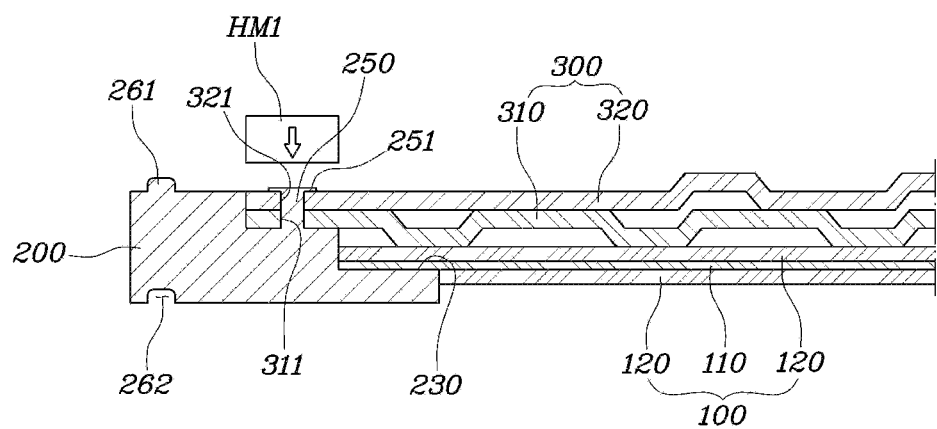

FIGS. 4A and 4B are diagrams showing an elastomeric cell frame for a fuel cell according to a second embodiment of the present disclosure.

As shown in FIGS. 4A and 4B, in an elastomeric cell frame for a fuel cell according to a second embodiment, at least one sealing protrusion 261 for surrounding the separator assembly 300 is disposed on one surface of both surfaces of the elastomeric frame 200 along the periphery of the region where the separator assembly 300.

Then, at least one sealing groove 262 for surrounding the separator assembly 300 is formed on the other surface of both surfaces of the elastomeric frame 200 along the periphery of the region where the separator assembly 300 is disposed. At this time, it is preferable that the sealing groove 262 is formed at a position corresponding to the position where the sealing protrusion 261 is formed, and the shape thereof is also formed in the shape corresponding to each other. Therefore, when the plurality of the elastomeric frames 200 are stacked, the sealing protrusion 261 and the sealing groove 262 of the elastomeric frame 200 adjacent to each other can face each other, thereby expecting the alignment effect before the thermal bonding, and the interface thereof in the thermal bonding is extended, thereby enhancing the bonding performance.

In addition, a plurality of first assembly through-holes 311 can be formed to be spaced apart from each other in a predetermined region along the rim thereof in the first separator 310 constituting the separator assembly 300, and the second separator 320 can be formed with a plurality of second assembly through-holes 321 communicated with the first assembly through-hole 311.

Then, an assembly protrusion 250 for penetrating the first assembly through-hole 311 and the second assembly through-hole 321 can be formed in the second step 240 of the elastomeric frame 200.

Therefore, as in FIG. 4A, it is disposed by penetrating the first assembly through-hole 311 and the second assembly through-hole 321 of the separator assembly 300 into the assembly protrusion 250 formed in the elastomeric frame 200.

In this state, as in FIG. 4B, pressure is applied while applying heat to the end portion 251 of the assembly protrusion 250 by using the hot-press mold HM1, and the end portion 251 of the assembly protrusion 250 is bonded to the surface of the separator assembly 300 while being enlarged in the flange shape.

Although FIGS. 4A and 4B have shown an embodiment in which all of the sealing protrusion 261, the sealing groove 262, and the assembly protrusion 250 are formed, only the sealing protrusion 261 and the sealing groove 262 can be formed, or only the assembly protrusion 250 can be formed.

Figure 5:
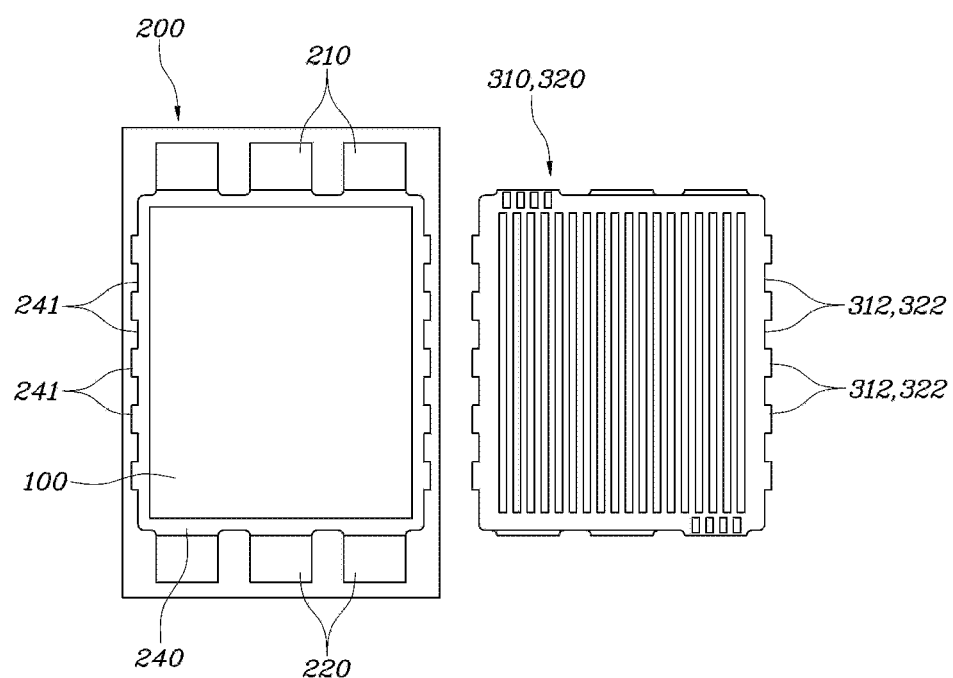
FIG. 5 is a diagram showing an elastomeric cell frame for a fuel cell according to a third embodiment of the present disclosure.

FIG. 5 is a diagram showing an elastomeric cell frame for a fuel cell according to a third embodiment of the present disclosure.

As shown in FIG. 5, in the elastomeric cell frame for the fuel cell according to a third embodiment, the first separator 310 constituting the separator assembly 300 is formed with a first uneven protrusion 312 laterally extended from the side surface thereof, and the second separator 320 is formed with a second uneven protrusion laterally extended from the side surface thereof in a shape corresponding to the first uneven protrusion 312.

Then, the outer circumferential surface of the second step 240 formed on the elastomeric frame 200 is formed with an uneven groove part 241 formed horizontally with the surface of the elastomeric frame 200 and coupled with the first uneven protrusion 312 and a second uneven protrusion 322

Therefore, when the separator assembly 300 is disposed on the second step 240 of the elastomeric frame 200 to be fused, it is possible to enhance the degree of assembly alignment by the shapes corresponding to each other, and to enhance the bonding performance by expanding the interface therebetween.

Figure 6A:
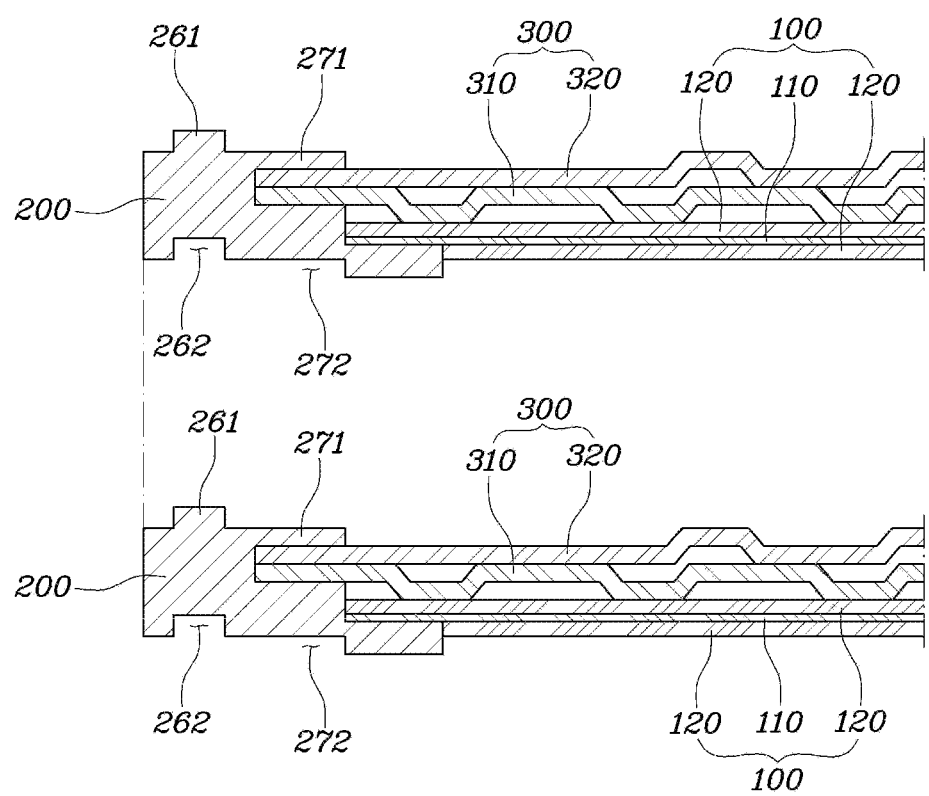
FIGS. 6A and 6B are diagrams showing an elastomeric cell frame for a fuel cell according to a fourth embodiment of the present disclosure.
Figure 6B:
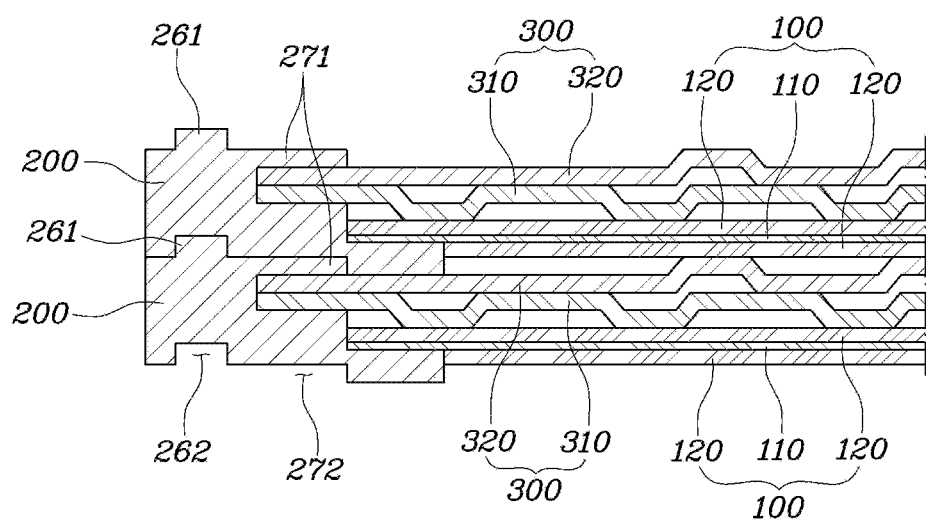

FIGS. 6A and 6B are diagrams showing an elastomeric cell frame for a fuel cell according to a fourth embodiment of the present disclosure.

As shown in FIGS. 6A and 6B, in an elastomeric cell frame for a fuel cell according to a fourth embodiment, a cover part 271 extended to cover the rim of the separator assembly 300 is formed on the upper surface of the elastomeric frame 200.

Then, a cover groove 272 is formed at a position corresponding to the position where the cover part 271 has been formed in the shape corresponding to a position where the cover part 271 has been formed in the lower surface of the elastomeric frame 200. Therefore, when the plurality of the elastomeric frames 200 are stacked, the cover part 271 and the cover groove 272 of the elastomeric frame 200 adjacent to each other face each other, thereby expecting the alignment effect before the thermal bonding, and the interface thereof in the thermal bonding is expanded, thereby enhancing the bonding performance.

Although FIGS. 6A and 6B have shown an embodiment in which all of the sealing protrusion 261, the sealing groove 262, the cover part 271, and the cover groove 272 are formed, only the sealing protrusion 261 and the sealing groove 262 are formed, or only the cover part 271 and the cover groove 272 can be formed.

Meanwhile, a fuel cell stack is configured by stacking the elastomeric cell frame for the fuel cell in plural.

As shown in FIG. 2B, the elastomeric cell frame including the insert 100, the separator assembly 300, and the elastomeric frame 200 are stacked in plural to form a fuel cell stack, and at this time, it is preferable that the elastomeric frames 200 of the elastomeric cell frame adjacent to each other are stacked while being thermally bonded.

That is, the elastomeric frames 200 of the elastomeric cell frame adjacent to each other are formed with a fifth fusion part H5 thermally bonded in the region facing each other. Therefore, the elastomeric frames 200 of the elastomeric cell frame adjacent to each other are bonded by the fifth fusion part H5.

Meanwhile, it is possible to expand the region of thermal bonding in order to enhance the bonding performance between the elastomeric frames 200 adjacent to each other.

Figure 7A:
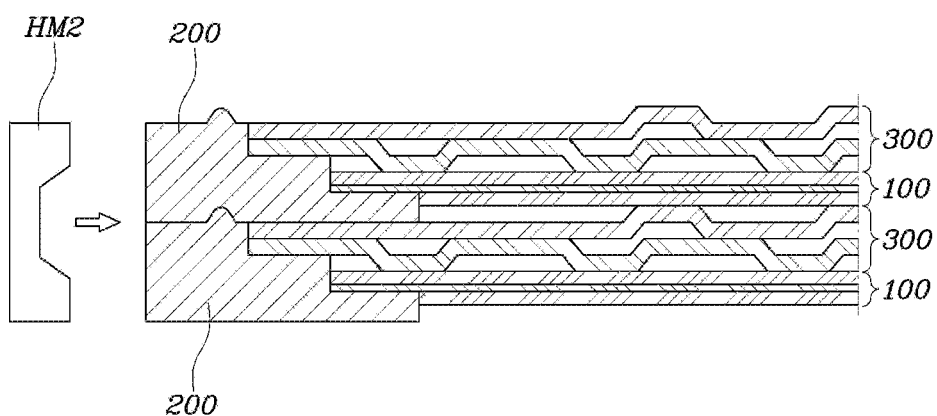
FIGS. 7A and 7B are diagrams showing an elastomeric cell frame for a fuel cell according to a fifth embodiment of the present disclosure.
Figure 7B:
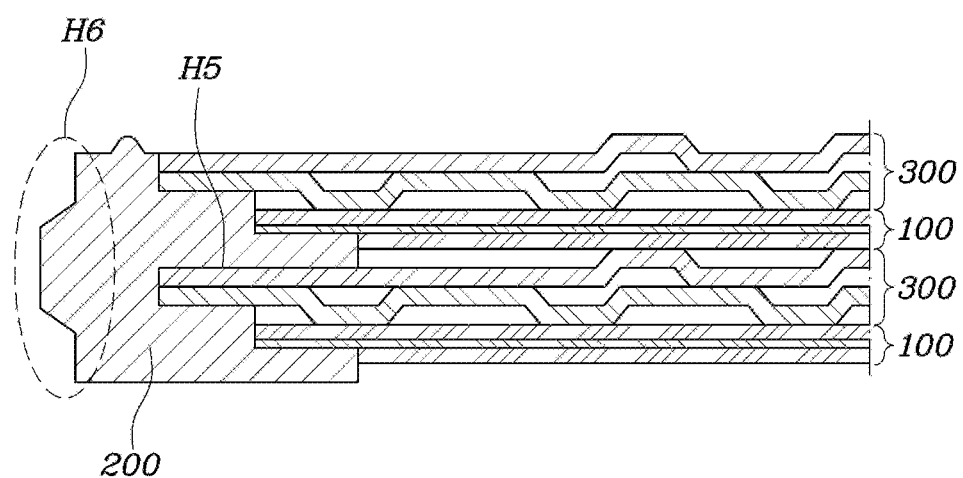

FIGS. 7A and 7B are diagrams showing an elastomeric cell frame for a fuel cell according to a fifth embodiment of the present disclosure.

As shown in FIGS. 7A and 7B, firstly, a plurality of elastomeric cell frames are stacked, and the upper surface and the lower surface facing each other are bonded by the thermal bonding in the elastomeric frames 200 adjacent to each other. Therefore, the fifth fusion part H5 is formed between the upper surface and the lower surface facing each other in the elastomeric frame 200 adjacent to each other.

In this state, a sixth fusion part H6 is formed in which pressure is applied while applying heat to the side portion of the elastomeric frame 200 by the hot-press mold HM2, and the side surfaces of the respective elastomeric frames 200 are integrally thermally bonded.

While the present disclosure has been described with reference to the accompanying drawings and the above-described preferred embodiments, the present disclosure is not limited to thereto, and is limited by the claims described later. Therefore, those skilled in the art can deform and modify the present disclosure variously within the scope of the technical spirit of the claims described later.

What is claimed is:

1. An elastomeric cell frame for a fuel cell, comprising:
   the elastomeric cell frame constituting a unit cell of the fuel cell,
   an insert in which a membrane electrode assembly and a pair of gas diffusion layers disposed on both surfaces of the insert have been bonded;
   a separator assembly disposed on one of the surfaces of the insert while a pair of separators is configured to face each other; and
   a sheet-shaped elastomeric frame disposed to surround a rim of the insert and a rim of the separator assembly and a side surface thereof in outside regions of the insert and the separator assembly, and integrally bonded with the rim of the insert and the rim of the separator assembly by thermal bonding.

2. The elastomeric cell frame for the fuel cell according to claim 1,
   wherein the thermal bonding is one of hot-press bonding, ultrasonic bonding, high frequency bonding, vibration bonding, infrared bonding, radiant-heat bonding, calender bonding and laser bonding.

3. The elastomeric cell frame for the fuel cell according to claim 1,
   wherein the elastomeric frame is formed with a reaction surface through-hole in which the insert is disposed, an inner circumferential surface of the reaction surface through-hole is formed with a first step for surrounding any one surface of the surfaces of the insert and the side surface thereof, and an outside of the first step is formed with a second step for surrounding any one surface of both surfaces of the separator assembly and the side surface thereof.

4. The elastomeric cell frame for the fuel cell according to claim 3,
   wherein any one of the pair of gas diffusion layers constituting the insert corresponds to a size of an inner circumferential surface of the first step, and
   wherein another one of the pair of gas diffusion layers and the membrane electrode assembly correspond to a size of an inner circumferential surface of the second step.

5. The elastomeric cell frame for the fuel cell according to claim 4,
   wherein a first fusion part thermally bonded while facing the first step of the elastomeric frame and the membrane electrode assembly of the insert is formed between the insert and the elastomeric frame, and
   wherein a second fusion part thermally bonded while facing the second step of the elastomeric frame and any one surface of both surfaces of the separator assembly is formed between the separator assembly and the elastomeric frame.

6. The elastomeric cell frame for the fuel cell according to claim 5,
   wherein a third fusion part thermally bonded while facing the first step of the elastomeric frame and the membrane electrode assembly of the insert and side surfaces of the pair of gas diffusion layers is formed between the insert and the elastomeric frame, and
   wherein a fourth fusion part thermally bonded while facing the second step of the elastomeric frame and the side surface of the separator assembly is formed between the separator assembly and the elastomeric frame.

7. The elastomeric cell frame for the fuel cell according to claim 3,
   wherein a plurality of inflow manifold through-holes into which reactant gas and coolant flow are formed at one side of the elastomeric frame, and a plurality of outflow manifold through-holes out which the reactant gas and the coolant flow are formed at another side thereof, and
   wherein the first step and the second step are formed between the plurality of inflow manifold through-holes and the plurality of outflow manifold through-holes.

8. The elastomeric cell frame for the fuel cell according to claim 3,
   wherein the separator assembly is composed of a first separator and a second separator facing each other,
   wherein the first separator is formed with a plurality of first assembly through-holes to be spaced apart from each other at a predetermined region along the rim thereof,
   wherein the second separator is formed with a plurality of second assembly through-holes communicated to the first assembly through-hole, and
   wherein the second step of the elastomeric frame is formed with an assembly protrusion for penetrating the first assembly through-hole and the second assembly through-hole.

9. The elastomeric cell frame for the fuel cell according to claim 8,
   wherein the end portion of the assembly protrusion is thermally bonded and a diameter thereof becomes larger than other regions of the assembly protrusion to be bonded to the separator assembly.

10. The elastomeric cell frame for the fuel cell according to claim 3,
    wherein the separator assembly is composed of a first separator and a second separator facing each other,
    wherein a first uneven protrusion laterally extended from the side surface thereof is formed on the first separator, wherein a second uneven protrusion laterally extended from the side surface thereof, and having a shape corresponding to the first uneven protrusion, and wherein an uneven groove part formed horizontally with the elastomeric frame, and coupled with the first uneven protrusion and the second uneven protrusion is formed on an outer circumferential surface of the second step.

11. The elastomeric cell frame for the fuel cell according to claim 1, wherein at least one sealing protrusion for surrounding the separator assembly is formed on one surface of both surfaces of the elastomeric frame along an outside of the region where the separator assembly is disposed.

12. The elastomeric cell frame for the fuel cell according to claim 11, wherein at least one sealing groove for surrounding the separator assembly along the outside of the region where the separator assembly is disposed, and having a shape corresponding to the sealing protrusion at a position corresponding to a position where the sealing protrusion has been formed is formed on another surface of the both surfaces of the elastomeric frame.

13. The elastomeric cell frame for the fuel cell according to claim 1, wherein a cover part extended to cover the rim of the separator assembly is formed on one surface of both surfaces of the elastomeric frame, and wherein a cover groove having a shape corresponding to the cover part at a position corresponding to a position where the cover part has been formed is formed on another surface of both surfaces of the elastomeric frame.

14. The elastomeric cell frame for the fuel cell according to claim 1, wherein the elastomeric frame is formed of a thermoplastic elastomer (TPE).

15. A method for manufacturing an elastomeric cell frame constituting a unit cell of a fuel cell stack, the method comprising:

preparing an insert by bonding a gas diffusion layer on both surfaces of a membrane electrode assembly, respectively;

preparing a separator assembly by facing and bonding a pair of separators;

preparing an elastomeric frame in a sheet shape;

disposing an upper portion of the elastomeric frame so as to overlap rims of the insert and the separator assembly; and bonding by thermal bonding an overlapped portion between the elastomeric frame, the insert, and the separator assembly.

16. The method for manufacturing the elastomeric cell frame according to claim 15, wherein in the bonding, the heat applied to the elastomeric frame is a temperature higher than the melting temperature of the elastomeric frame.

17. The method for manufacturing the elastomeric cell frame according to claim 15, wherein in the bonding, the elastomeric frame is bonded to the insert and the separator assembly while the elastomeric frame is thermally bonded without a separate adhesive member.

18. A fuel cell stack, comprising:

a plurality of elastomeric cell frames including an insert in which a membrane electrode assembly and a pair of gas diffusion layers disposed on both surfaces thereof that are stacked together;

a separator assembly disposed on one surface of the insert while a pair of separators is configured to face each other; and a sheet-shaped elastomeric frame disposed to surround a rim of the insert and a rim of the separator assembly and a side surface thereof in outside regions of the insert and the separator assembly, and integrally bonded with the rim of the insert and the rim of the separator assembly by thermal bonding, wherein the fuel cell stack is stacked while the elastomeric frames of the elastomeric cell frame adjacent to each other are bonded by the thermal bonding therebetween.

19. The fuel cell stack according to claim 18, wherein the elastomeric frames of the elastomeric cell frame adjacent to each other are formed with a fifth fusion part bonded by the thermal bonding therebetween in the region facing each other.

20. The fuel cell stack according to claim 19, wherein the elastomeric frames of the elastomeric cell frame adjacent to each other are formed with a sixth fusion part bonded while the respective side surfaces thereof are integrally thermally bonded.

* * * * *